US007692809B2

(12) United States Patent
McQuillan

(10) Patent No.: US 7,692,809 B2
(45) Date of Patent: Apr. 6, 2010

(54) PRINTER HAVING REMOTE TRANSMISSION CAPABILITIES FOR TECHNICAL SUPPORT AND DIAGNOSTICS

(75) Inventor: Séamus McQuillan, Clones (IE)

(73) Assignee: Xerox Corporation, Norwalk, CT (US)

( * ) Notice: Subject to any disclaimer, the term of this patent is extended or adjusted under 35 U.S.C. 154(b) by 1114 days.

(21) Appl. No.: 11/158,397

(22) Filed: Jun. 22, 2005

(65) Prior Publication Data
US 2006/0290971 A1 Dec. 28, 2006

(51) Int. Cl.
H04N 1/00 (2006.01)

(52) U.S. Cl. .................. 358/1.15; 358/1.14; 358/504; 399/8; 399/9

(58) Field of Classification Search ............... 358/1.14, 358/1.15, 504; 399/8, 9
See application file for complete search history.

(56) References Cited

U.S. PATENT DOCUMENTS

| 5,200,958 | A | 4/1993 | Hamilton et al. | |
| 6,353,899 | B1 | 3/2002 | Martin et al. | |
| 6,728,343 | B1* | 4/2004 | Taylor et al. | 379/71 |
| 6,950,613 | B2* | 9/2005 | Fujimoto et al. | 399/8 |
| 7,295,882 | B2* | 11/2007 | Champion et al. | 700/94 |
| 2002/0075508 | A1* | 6/2002 | Luman | 358/1.15 |
| 2004/0002782 | A1* | 1/2004 | Champion et al. | 700/94 |
| 2004/0012808 | A1* | 1/2004 | Payne et al. | 358/1.15 |
| 2004/0101345 | A1* | 5/2004 | Hirota et al. | 400/625 |
| 2004/0105116 | A1* | 6/2004 | Kim | 358/1.14 |
| 2005/0078967 | A1* | 4/2005 | Fujimoto et al. | 399/8 |
| 2005/0157329 | A1* | 7/2005 | Park et al. | 358/1.15 |
| 2005/0185217 | A1* | 8/2005 | Nishizawa et al. | 358/1.15 |
| 2006/0256367 | A1* | 11/2006 | Wei | 358/1.15 |

OTHER PUBLICATIONS

Wikipedia, Bluetooth—Wikipedia, the free encyclopedia, Internet website http://en.wikipedia.org/wiki/Bluetooth.

* cited by examiner

Primary Examiner—Twyler L Haskins
Assistant Examiner—Kent Yip
(74) Attorney, Agent, or Firm—Fay Sharpe LLP

(57) ABSTRACT

A printer includes a printing module, a system status module, and a transmitter. The transmitter is in communication with the system status module. The transmitter is adapted to transmit a signal in response to a code generated by the system status module. A method for providing a code to an operator of a printer includes communicating a fault or warning code to a transmitter of the printer and transmitting a signal that corresponds to the code via an RF, an IR or an ultrasonic transmission.

20 Claims, 3 Drawing Sheets

PRINTER HAVING REMOTE TRANSMISSION CAPABILITIES FOR TECHNICAL SUPPORT AND DIAGNOSTICS

BACKGROUND

A copying machine, or other apparatus including a digital copier, bookmaking machine, facsimile machine, multi-function machine, etc. that performs a print outputting function, is subject to a system fault that impacts the operation of the machine. These faults include paper jams, toner and colorant shortages, media (e.g. paper, etc.) shortages, and the like. Some system faults may not immediately impact the operation of the machine, for example a low paper warning. System faults that do not immediately impact the operation of the machine can be referred to as warnings.

Printers, which can include a digital copier, bookmaking machine, facsimile machine, multi-function machine, etc., typically include a printer status system that detects printer faults and/or warnings. Typically, once a fault is detected, the printer stops functioning. The printer status system communicates with a display of the printer to indicate the fault or warning detected. If a warning is detected, the printer status system provides a signal, for example an audible beep or a graphical indication, of the warning.

Printing operations can include many machines that are operated by a few operators. For example, a company that is in the business of making a large amount of copies can have many copying machines that are operated by a few operators. When a fault/warning occurs in the copying machine, e.g. a paper jam, low toner and/or colorant, low paper, the operator may not be near the machine. If the operator is not near the machine in which the fault/warning has occurred, he typically stops the machine at which he is working and moves to the machine in which the fault has occurred. This can lead to downtime in machines that are working without any faults.

Known printing machines, which include the above-described apparatus, do not include systems to wirelessly communicate with an operator that is not near the machine. Known printing machines also do not include systems that allow an operator to remotely communicate with the machine to allow the operator to remotely remedy the system fault/warning.

SUMMARY

Figure 1:
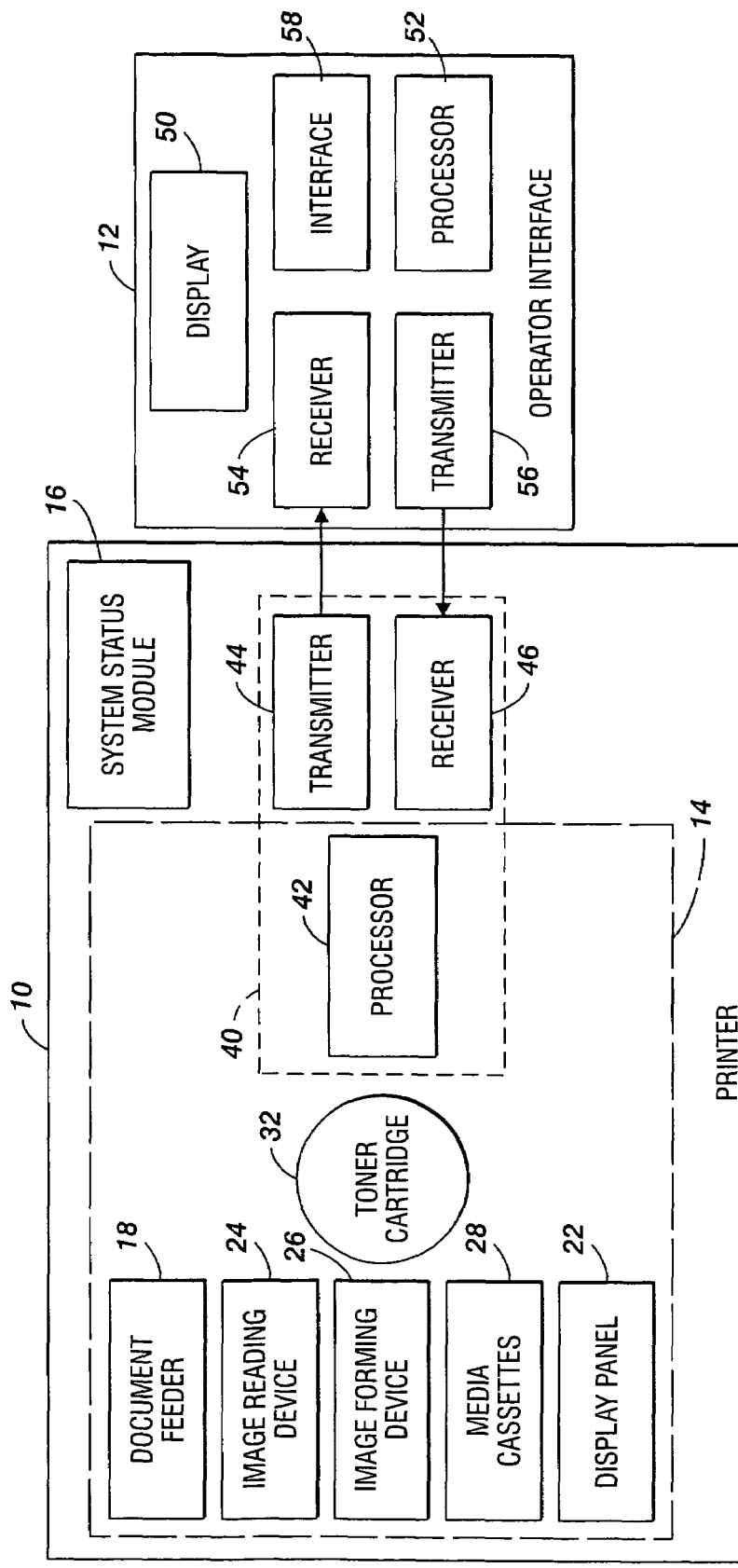
FIG. 1 is a block diagram of a printer and an operator interface.

According to aspects illustrated herein, there is provided a method for remotely providing a signal to an operator of a printer. The method includes communicating a fault or warning code to a transmitter of the printer and transmitting a signal that corresponds to the code via an RF, an IR or an ultrasonic transmission.

According to other aspects illustrated herein, there is provided a method for remotely interacting with a printer. The method includes translating a fault or warning code that has been generated by the printer into a first signal, wirelessly transmitting the first signal, and wirelessly receiving a second signal.

According to other aspects illustrated herein, there is provided a printer including a printing module, a system status module, and a transmitter. The transmitter is in communication with the system status module. The transmitter is adapted to transmit a signal in response to a code generated by the system status module.,

DETAILED DESCRIPTION

A printing system includes a printer 10 and a remote operator interface 12. The word "printer" as used herein encompasses any apparatus, such as a digital copier, bookmaking machine, facsimile machine, multi-function machine, etc. that performs a print outputting function. In the depicted embodiment, the printer 10 includes a printing module 14 and a system status module 16. The printing module includes a document feeder 18, a display panel 22, an image reading device 24, and an image forming device 26. The document feeder 18 feeds documents to the image reading device 24. The display panel 22 displays information to the operator of the printer 10 and can also receive input from the operator. In an embodiment of the printer 10, the image reading device 24 typically illuminates the document and the resulting reflection from the document is transformed to a corresponding electric signal, or image signal, by a solid state imaging device, e.g., a CCD (Charge Coupled Device) image sensor. The image forming device 26 forms an image represented by the image signal on a plain paper, velum or a thermosensitive paper by an electrophotographic, thermosensitive, heat transfer, ink jet or similar conventional system.

The printing module can also include a plurality of media cassettes 28, e.g. paper trays, that store media, e.g. paper. The media are fed to the image reading device 24 via a media transport system (not shown) that can include a plurality of rollers and other media handling equipment. Toner and/or colorants are stored in cartridges 32, and the like, and are deposited on the media to form an image. The printing module can include other media handling devices, such as a duplex copy unit (not shown), as well as software, e.g. an operating system (OS), and hardware that control the operation of the printer. The hardware and software can include memory, controllers, processors, application specific integrated circuits, and the like. The printing module 14 can include more or less components than those described above.

The system status module 16 monitors the operation of the printer 10 to detect for system faults and warnings, such as paper jams, low toner warnings, low paper warnings, out of staple fault, output tray full status and the like. For example, the system status module 16 can communicate with a jam detection system (not shown) that is incorporated into the printer. The jam detection system includes a plurality of sensors and/or switches that communicate with a processor, an example of which is described below. The sensors and/or switches detect a copy sheet, for example, as it moves along the media transport system. If the copy sheet, or other media that is being handled by the printer, fails to travel between sensors within a predetermined amount of time, the jam detection system can indicate that a paper jam has occurred. In such an instance, the jam detection system can communicate with the system status module 16. Knowing the location of the sensors, the jam detection system can also provide a location of the paper jam to the system status module 16. The system status module 16 can also communicate with other sensors and detection systems, for example a paper tray quantity detection system that detects when a paper tray is low, a toner detection system that detects when the toner and/or colorant is low or needs to be replaced, a stapler detection system that detects when the printer is low on or out of staples, and an output tray detection system that indicates when an output tray should be emptied. The system status module 16 can also communicate with other detection systems that detect for conditions that would impact the operation of the printer.

The printer 10 also includes a remote communication system 40 that includes a processor 42, which can comprise the hardware and software of the printing module described above or can be dedicated to the remote communication system 40, a transmitter 44 and a receiver 46. When a fault, e.g. a paper jam, or a warning, such as a low paper warning, occurs, the system status module 16 generates a warning and/or fault code and typically delivers the code to the display panel 22, which is connected to the printer 10, where a message that corresponds to the code is displayed. To receive this message, the operator of the, printer 10 must be near the printer. Since the described printing system works with fault and warning codes, the status detected by the system status module will be referred to hereafter as a fault/warning code.

The system status module 16 in the depicted embodiment communicates with the remote communication system 40 in the event of a fault/warning. The remote communication system 40 allows the printer 10 to communicate with an operator who is not near the printer 10. The system status module 16 delivers the fault/warning code to the processor 42 or directly to a transmitter 44. In the event that the fault/warning code is sent to the processor 42, the processor 42 translates the code into a signal, which can include a digital signal or an analog signal, using software and hardware. This signal is sent from the printer 10 via the transmitter44. The transmitter 44 can transmit an RF signal, an IR signal as well as other known signals, such as an ultrasonic signal. The transmitter 44 allows the printer 10 to communicate with the operator interface 12 in a manner that will be described in more detail below. The transmitter 44 and the processor 42 can include, for example, Bluetooth technology, which provides a manner to connect and remotely exchange information between devices. Alternatively, the transmitter 44 can be provided with other software and hardware that allows the printer 10 to remotely communicate, e.g. without wires, with the operator interface 12. In the event that the fault/warning code is sent directly to the transmitter 44, for example when the system status module 16 generates a digital code, the transmitter 44 can directly transmit the digital signal the corresponds to the digital code.

In an embodiment the transmitter 44 is configured to deliver voice signals to the operator interface 12. The term "voice signal" as used herein is any signal, e.g. analog or digital signal, that is capable of being translated or converted into an audible message in a spoken language that can be understood by a human. The language is not limited to any particular language. For example, when a low paper warning occurs for paper tray 1, which can refer to one of the media cassettes 28, of the printer 10, the transmitter 44 can deliver a voice signal that is the digital or analog equivalent to "low paper in tray 1," or the like. Accordingly, the transmitter 44 and the processor 42 cooperate with one another to generate and deliver voice signals.

In another embodiment, the transmitter44 is configured to deliver a signal indexing a voice message. The term "signal indexing a voice message" as used herein is any signal that is capable of being indexed to a voice message. For example, the transmitter 44 can transmit a digital signal that when received by the operator interface 12 corresponds to a voice message. The operator interface 12 can then match the signal to a corresponding voice message and display the voice message.

In an embodiment, the processor 42 is programmed such that certain fault/warning codes generate a corresponding voice signal. Also, the printer 10 can include a recording system to allow the user of the printer to input voice signals that correspond to certain fault/warning codes. The recording system can be configured to allow a user to input a text message that can be converted via text message to voice message software, or the recording system can allow for the audio recording of voice messages. In addition to, or in lieu of the voice signals, other audible signals can be generated in response to fault/warning codes, for example a beep, a ring tone and the like.

The receiver 46 can receive signals from the operator interface 12 and communicate with the system status module 16 and/or the processor 42. The receiver 46 is configured to receive RF signals, IR signals, as well as other known remote signals. The receiver can also include, for example, Bluetooth technology and/or other technology that allows the printer 10 to receive signals from a remote device. Similar to the transmitter 44, the receiver 46 can also receive voice signals and deliver corresponding signals, e.g. indexed codes, to the system status module 16 and/or the processor 42. As per the example described above, after the transmitter 44 transmits the signal "low paper in tray 1," the receiver 46 might receive a signal that states "switch to tray 2." In such a case, the receiver 46 can receive an analog or digital signal that corresponds to "switch to tray 2." In such a case, the processor 42 can translate, via voice recognition software, the signal into a code, signal or command that the system status module 16 and/or processor 42 can understand to allow the system status module and/or processor to perform a corrective operation. Alternatively, the operator interface 12, which is described in more detail below, can translate a voice command or other signal from the operator into a signal that is readily understandable by the system status module 16 so that the system status-module and/or processor can perform the corrective operation without having to translate the signal.

The operator interface 12 allows the operator of the printer 10 to remotely communicate with the printer. The operator interface 12 can include a personal digital assistant (PDA), a mobile phone, a laptop computer, a personal computer (PC), an electronic handheld device, or other electronic device that can allow the operator to communicate with the printer. In the depicted embodiment, the operator interface 12 includes a display 50 that can include a liquid crystal display, or other known device for displaying graphical information. The display can also include a speaker so that audible signals can be displayed or generated. The display 50 communicates with a processor 52 that communicates with a receiver 54 and a transmitter 56. The receiver 54 is configured to receive a signal from the transmitter 44 on the printer 10. Accordingly, the operator interface 12 can include, for example, Bluetooth technology, as well as other software and hardware that allows the receiver 54 to communicate with the transmitter 44 on the printer. The processor 52 is configured to translate the signal received from the receiver 54 into a code and/or message that can be displayed via the display, the noun "display" meaning any type of visual, audio or other communication to a human user. For example, with the example provided above where tray 1 of the media cassettes 28 is low, the display can indicate, either graphically or audibly, "tray 1 is low," or some similar display.

The operator interface 12 also includes an interface 58 through which the operator of the printer 10 can communicate with the printer. The interface 58 can include a keyboard, a key pad, a microphone, a joy stick or other mechanism through which a user can input information. The interface 58 communicates with the processor 52, which communicates with the transmitter. With the example provided above, where tray 1 of the media cassette 28 is low, the operator can input a command such as "switch to tray 2," or the like. The input can be via voice control or via keys, or other similar fashion via the interface 58.

The printer 10 can be one of many printers that are located in a certain location, such as the floor of a building. One operator interface 12 can communicate with multiple printers. In such a situation each printer 10 can have a unique identification that is transmitted to the operator interface 12. The unique identification can include an Internet protocol (IP) address that is assigned to the printer 10 at the manufacturing facility, or later. The unique address can be much simpler, such as "Printer #1." When communicating with the operator interface 12, the printer 10 can provide its unique identification. For example the printer 10 can generate a signal that corresponds to "Printer #7—Tray 1 is low."

Figure 2:
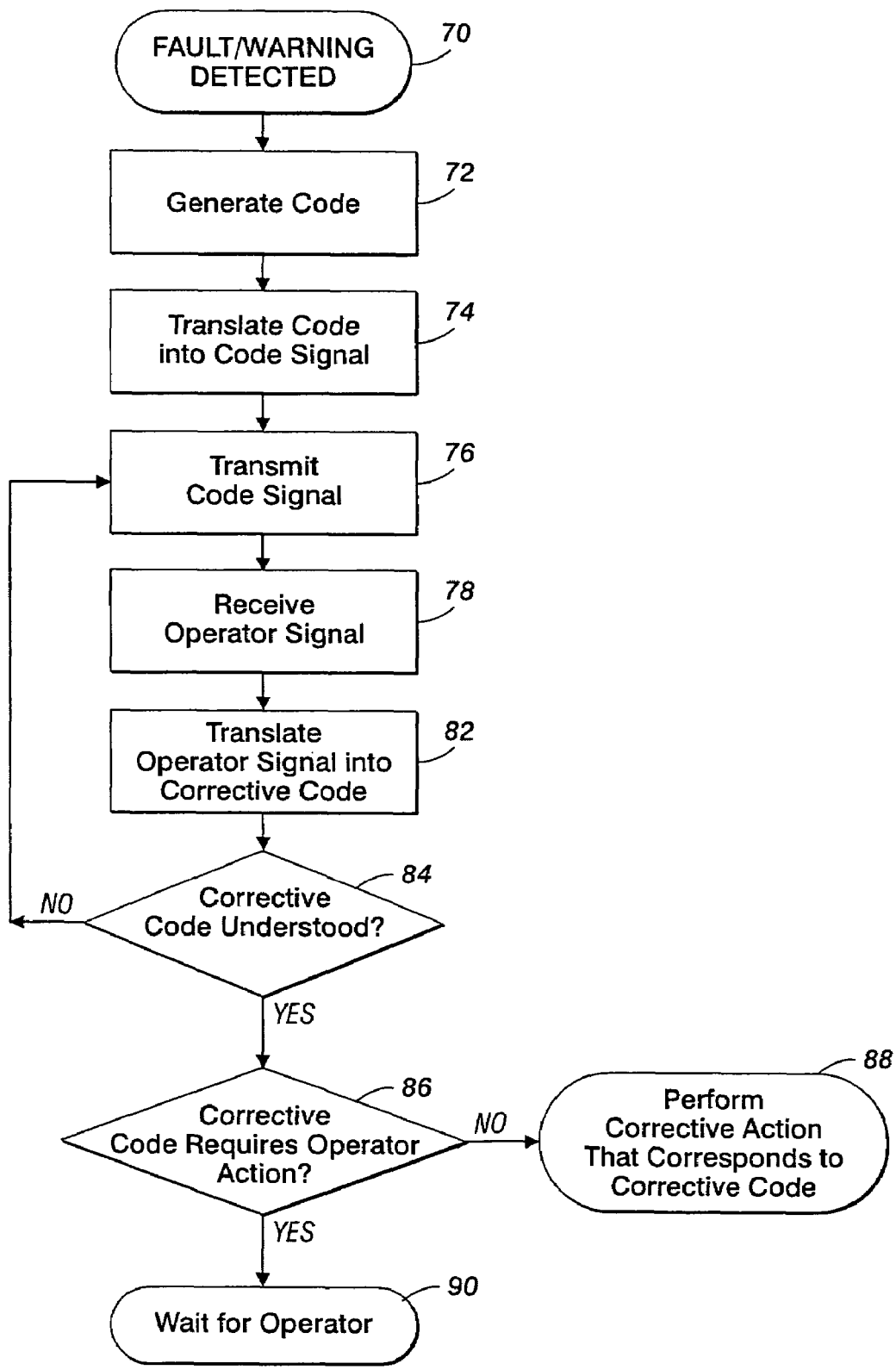
FIG. 2 is a flow diagram of a method that is performed by the printer to alert an operator of a fault/warning signal and to remedy the fault/warning.

With reference to FIG. 2, a method performed by the printer 10 (FIG. 1) to communicate the printer status to the operator will be more particularly described. The system status module 16 (FIG. 1) detects a fault/warning, e.g. low paper in a tray, low toner, a paper jam, and the like, at 70. The system status module 16 (FIG. 1) generates a code that corresponds to the fault/warning at 72. At 74, the processor 42 (FIG. 1) via a converter or conversion program translates or converts the code that corresponds to the fault/warning that has been detected into a code signal. At 76, the code signal is transmitted via the transmitter 44 (FIG. 1). The code signal can be transmitted, for example, via RF, IR or an ultrasonic transmission. The code signal can include an audible signal, a voice signal, which has been described above, or a signal indexing a voice message, which has also been described above.

The printer 10 (FIG. 1) can then receive an operator signal at 78 via the receiver 46 (FIG. 1). The operator signal can also be an RF, IR or ultrasonic transmission. At 82, the operator signal can be converted into a corrective code by the processor 42 (FIG. 1). The processor 42 can determine whether the corrective code is valid or translatable at 84. If the processor 42 (FIG. 1) does not understand the corrective code, for example if the operator signal was invalid, the printer 10 can retransmit the code signal again, at 76, and await to receive an operator signal again at 78. If the corrective code is understood the processor 42 can determine, at 86, whether the corrective code requires manual operator action. If the corrective code does not require manual operator action, for example switching from one paper tray to another, then the printer 10 via the processor 42 and other hardware and drive mechanisms located in the printer, can perform the corrective action that corresponds to the corrective code at 88. If the corrective code does require manual operator action then, at 90, the printer 10 can wait 90 in a standby mode for the operator to come over to the printer.

Figure 3:
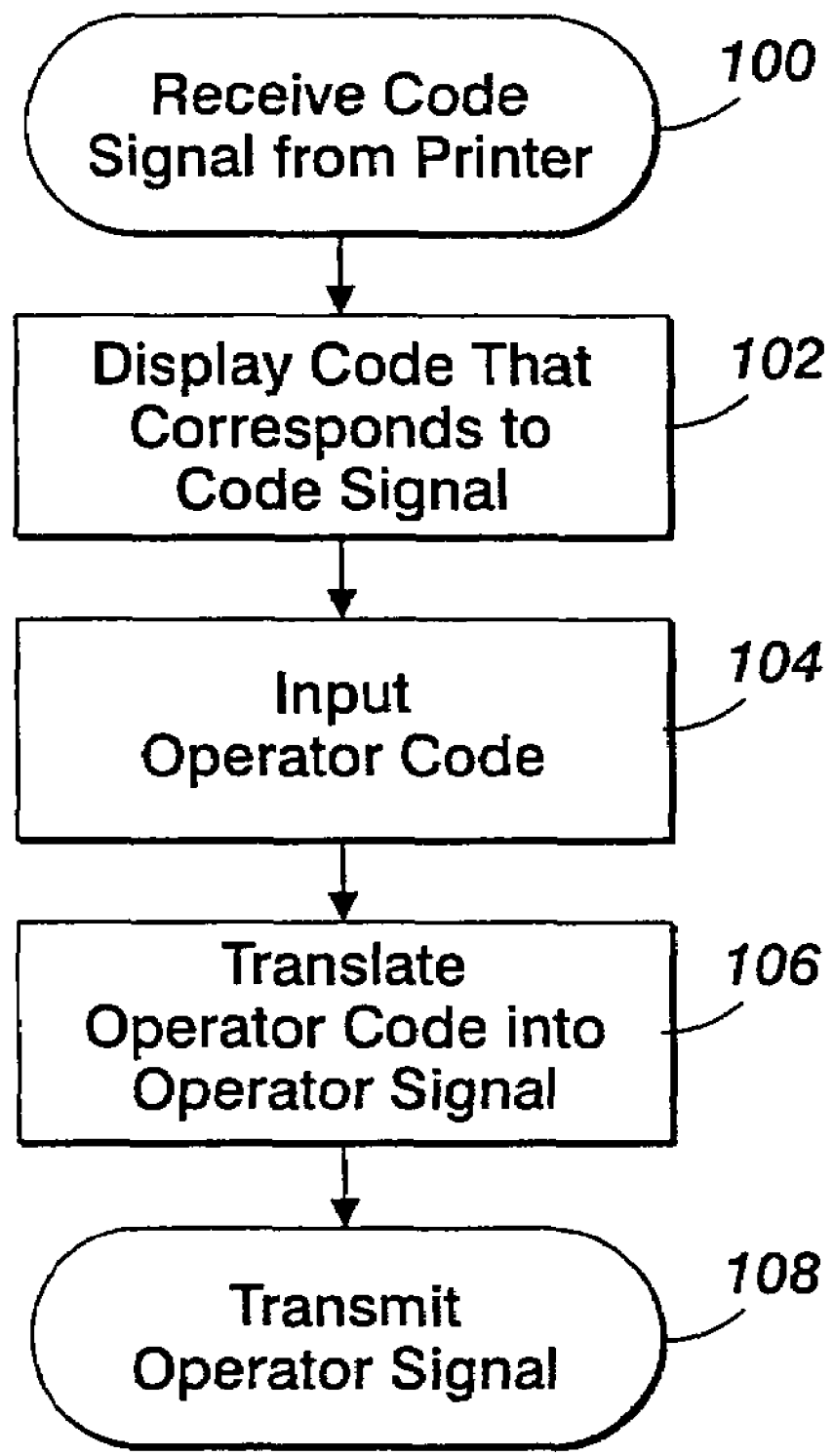
FIG. 3 is a flow diagram of a method that is performed by the operator, via an operator interface, after receiving a fault/warning signal from the printer.

With reference to FIG. 3, the method performed by the operator to communicate with the printer 10 (FIG. 1) is disclosed. At 100 the operator interface printer 12 (FIG. 1) receives the code signal, e.g. a voice signal, a signal indexing a voice message, etc. from the printer 10 (FIG. 1). At step 102, the operator interface 12 (FIG. 1) displays a code or message that corresponds to the code signal. The word "display" includes for example, any type of visual, audio or other communication to a human user, at any time, through any device. Accordingly, the code signal can run through a conversion program to convert the analog or digital signal that has been received by the receiver 54 (FIG. 1) of the operator interface 12 (FIG. 1) to convert the signal into a desired output such as a voice message in a spoken language that is understood by the operator. Also, the signal can be delivered from the receiver to the processor that includes an index of voice messages. The corresponding voice message can then be displayed.

In response to the code signal, at 104, the operator inputs an operator code. The operator code can be input via a microphone, e.g. a voice message, a keyboard or keypad, e.g. a graphical code, a joy stick, or other known user interface. The operator code is then translated or converted into an operator signal at 106 using programming that is located on the processor 52 (FIG. 1). For example, the operator can speak into the interface 58, which can include a microphone, "switch paper tray" which can be translated via software into a signal that can be understood by the receiver 46 and/or the processor 42 of the printer 10. For example, the processor 42 can run software that converts an analog signal, such as voice input, to a digital signal that can be transmitted via the transmitter 56 (FIG. 1). Once converted, the operator signal is transmitted at 108 via the transmitter 56 (FIG. 1). The operator response signal can also include a signal indexing a voice message. In such an instance, the printer 10 can include an index of commands that correlate to a received voice message.

As indicated above, the printer 10 (FIG. 1) can include a unique identification. This unique identification can be transmitted to the operator interface 12 accompanying the fault/warning code signal. Furthermore, in addition to transferring fault/warning signals from the printer 10 to the operator interface 12 and receiving corrective signals from the operator interface 12 to the printer 10, the system can also allow for communication between the operator interface 12 and the printer 10 where there is no fault or warning status. For example, the printer 10 can generate a signal that indicates a first print job is completed. Such a signal may not typically be considered a fault or warning signal; however, since the completion of a job impacts the operation of the machine if the machine were not to continue to operate, such a job completion status may be considered a fault/warning status. Accordingly, the printer can provide a signal such as, "print job number 123 completed." The operator can then communicate with the printer 10 via the operator interface 12 to tell the printer to move to print job 124. As can be seen from the above-described examples, the operator interface 12 and the printer 10 communicate with one another in a number of different manners to communicate a number of different types of information.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. In a printer, a method for remotely interacting with the printer, the method comprising:

translating a fault or warning code that has been generated by the printer into a first signal indexing a voice message;

wirelessly transmitting the first signal by way of a transmitter on the printer; and wirelessly receiving a second signal comprised of a voice signal;

translating the second signal into a corrective code;
determining whether the corrective code requires manual operator action;
where the corrective code requires manual operator action, waiting for an operator;
where the corrective code does not require manual operator action, performing a corrective action that corresponds to the corrective code; and
wirelessly transmitting a third signal to convey a unique printer identification of the printer, comprising an Internet protocol address unique to a specific printing device.

2. The method of claim 1, wherein the third signal comprises a printer identification.

3. The method of claim 1, wherein the third signal comprises a print job identification.

4. The method of claim 1, further comprising determining if the corrective code is valid; and
where the corrective code is invalid, retransmitting the first signal;
where the corrective code is valid, then determining whether the corrective code requires manual operator action.

5. The method of claim 1, wherein the corrective code further comprises at least one suggestion regarding to how to fix a printer problem.

6. A printer comprising:
a printing module;
a jam detection system comprised of at least one of a sensor and a switch;
a system status module for receiving a signal from the jam detection system and conveying said signal to system status module;
a transmitter in communication with the system status module, the transmitter being adapted to transmit a signal in response to a code generated by the system status module;
a receiver in communication with the system status module, the receiver being configured to receive a signal and communicate with the system status module, wherein the receiver is configured to receive a voice signal or a signal indexing a voice message;
a processor configured to convert a signal received by the receiver into a corrective code and configured to perform corrective action that corresponds to the corrective code when the corrective action does not require manual operator action; and
a recording system to receive and reproduce at least one of text and voice data.

7. The printer of claim 6, wherein the system status module is configured to detect at least one of a status from a group comprising a low paper warning, a paper jam, a low toner warning, a low staple warning and an output tray full condition.

8. The printer of claim 6, wherein the transmitter is configured to transmit a signal indexing a voice message.

9. The printer of claim 6, wherein the transmitter is configured to transmit a voice signal.

10. The printer of claim 6, wherein the processor includes a printer identification.

11. The printer of claim 10, wherein the transmitter is configured to transmit the printer identification.

12. The printer of claim 6, further comprising an index of commands that correlate to a received voice message.

13. The printer of claim 6, wherein the system status module further comprises a paper tray quantity detection system, a toner detection system, a stapler detection system, and an output tray detection system.

14. The printer of claim 6, wherein the system status module can performs a corrective operation without translating the signal.

15. The recording system of claim 6, further allowing the user to input voice signals and translate voice signals into text messages corresponding to fault warning codes.

16. The recording system of claim 6, further comprising transformation software to facilitate enabling a user to input a text message that can be transformed to a voice message.

17. The printer of claim 6, further comprising a recording system that can allow for the recording of voice messages.

18. In a printer, a method for remotely interacting with the printer, the method comprising:
translating a fault warning code that has been generated by the printer into a first signal wherein the fault warning indicates at least one of: low paper, low toner, low staples, paper jam, output tray full, and switch to tray two;
wirelessly transmitting the first signal, wherein the first signal includes a voice message or a signal indexing to a voice message;
wirelessly receiving a second signal;
translating the second signal into a corrective code;
determining whether the corrective code is valid wherein a valid code comprises a code understood by and translatable by the processor;
where the corrective code is invalid, retransmitting the first signal;
where the corrective code is valid, determining whether the corrective code requires manual operator action;
where the corrective code requires manual operator action, generating a suggested corrective action, then waiting for an operator; and
where the corrective code does not require operator action, performing a corrective action that corresponds to the corrective code.

19. The method of claim 18, wherein the received second signal is a voice message, and the printer includes a processor for translating the second signal into the corrective code.

20. The method of claim 18, wherein the received second signal is a digital signal.

* * * * *